United States Patent [19]

Duckworth et al.

[11] 4,270,074
[45] May 26, 1981

[54] BRUSHLESS DC MOTOR CONTROL UTILIZING A ROM

[75] Inventors: James J. Duckworth, Morris Plains; William J. Glennon, Maplewood, both of N.J.

[73] Assignee: The Singer Company, Little Falls, N.J.

[21] Appl. No.: 86,874

[22] Filed: Oct. 22, 1979

[51] Int. Cl.³ ............................................. H02P 6/02
[52] U.S. Cl. ................................. 318/254; 318/138; 318/439
[58] Field of Search ................ 318/138, 254, 254 A

[56] References Cited

U.S. PATENT DOCUMENTS

| | | | |
|---|---|---|---|
| 3,976,174 | 6/1976 | Kögler et al. | 318/254 |
| 3,979,651 | 9/1976 | Bringol | 318/138 |
| 4,100,471 | 7/1978 | Pritchard | 318/138 |
| 4,107,593 | 8/1978 | Anderson | 318/138 |
| 4,151,449 | 4/1979 | Takahashi | 318/138 |

Primary Examiner—Stanley J. Witkowski
Assistant Examiner—John W. Redman
Attorney, Agent, or Firm—Morris Liss; Thomas W. Kennedy

[57] ABSTRACT

The power switch driver circuit of a brushless DC motor control ensures synchronous operation by utilizing a ROM addressed by motor shaft position sensors. Excess current drawn by the motor windings is sensed by a detector which provides an additional bit of address input to correct the condition. The address input may also be modified by a bit signifying forward or reverse operation of the motor.

2 Claims, 2 Drawing Figures

BRUSHLESS DC MOTOR CONTROL UTILIZING A ROM

FIELD OF THE INVENTION

The present invention relates to motor controls and more particularly to a digitally operated control for a brushless DC motor.

BRIEF DESCRIPTION OF THE PRIOR ART

Brushless DC motors have become increasingly popular in a number of applications requiring relatively high starting torque in low power applications, such as computer tape drive motors. In order to ensure synchronous operation of such a motor, position sensors operating in conjunction with the motor shaft provide inputs to logic circuitry which in turn governs the operation of transistorized power switches. These switches control the energization of motor stator windings in such a fashion to ensure synchronous operation. The prior art relating to this system is discussed in the engineering handbook entitled "DC Motors, Speed Controls and Servo Systems" published by Electro-Craft Corp. of Hopkins, Minnesota (Third Edition). Traditionally, power transistors are utilized to gate energizing signals to the windings of the brushless DC motor. The power switches are in turn controlled by driver circuitry employing logic components existing on integrated circuits. Use of such integrated circuits requires quite a few modules, except in the most simple of configurations. The reliability of the motor control system needs to be improved by a reduction in the number of components used as well as the number of interconnections.

A further disadvantage of the traditional integrated circuits design is the relatively slow signal throughput speed.

In addition of the desire for the amelioration of these problems, it would be desirable to effect a control system of lower weight and smaller size.

BRIEF DESCRIPTION OF THE PRESENT INVENTION

The present invention achieves a successful resolution of the aforementioned problems and additional advantages by utilizing a ROM in lieu of the integrated circuits of the prior art. Whereas ROM's are traditionally configured with microcode instructions, the present invention utilizes the ROM in the unorthodox manner of storing a Boolean truth table which achieves the same binary outputs for given address inputs as would be the case with integrated circuit logic.

When utilizing the present invention, a brushless DC motor control is capable of realizing:

1. a reduction in the number of integrated circuits required in all cases, except the very simplest motor configurations;
2. improved reliability due to the reduction in the number of components and their interconnections; and
3. lower weight and smaller size due to the reduction in numbers.

Simplified system design is achieved since the ROM becomes a universal interface between shaft position sensors and the power switching devices which govern energization of the motor stator windings. Any of the following design changes can be implemented by simply changing the truth table stored in the ROM with few, if any, circuit or printed circuit board changes:

1. inverted logic sense on one or more of the ROM inputs, including those from the shaft position sensors;
2. inverted logic sense on one or more of the outputs from the ROM to the power switching devices;
3. various conduction angles such as 120 degrees or 180 degrees;
4. the addition of bi-directional capability to a unidirectional motor;
5. addition of current limiting capability to a non-current limiting motor.

The above-mentioned objects and advantages of the present invention will be more clearly understood when considered in conjunction with the accompanying drawings, in which:

DETAILED DESCRIPTION OF THE INVENTION

Figure 1:
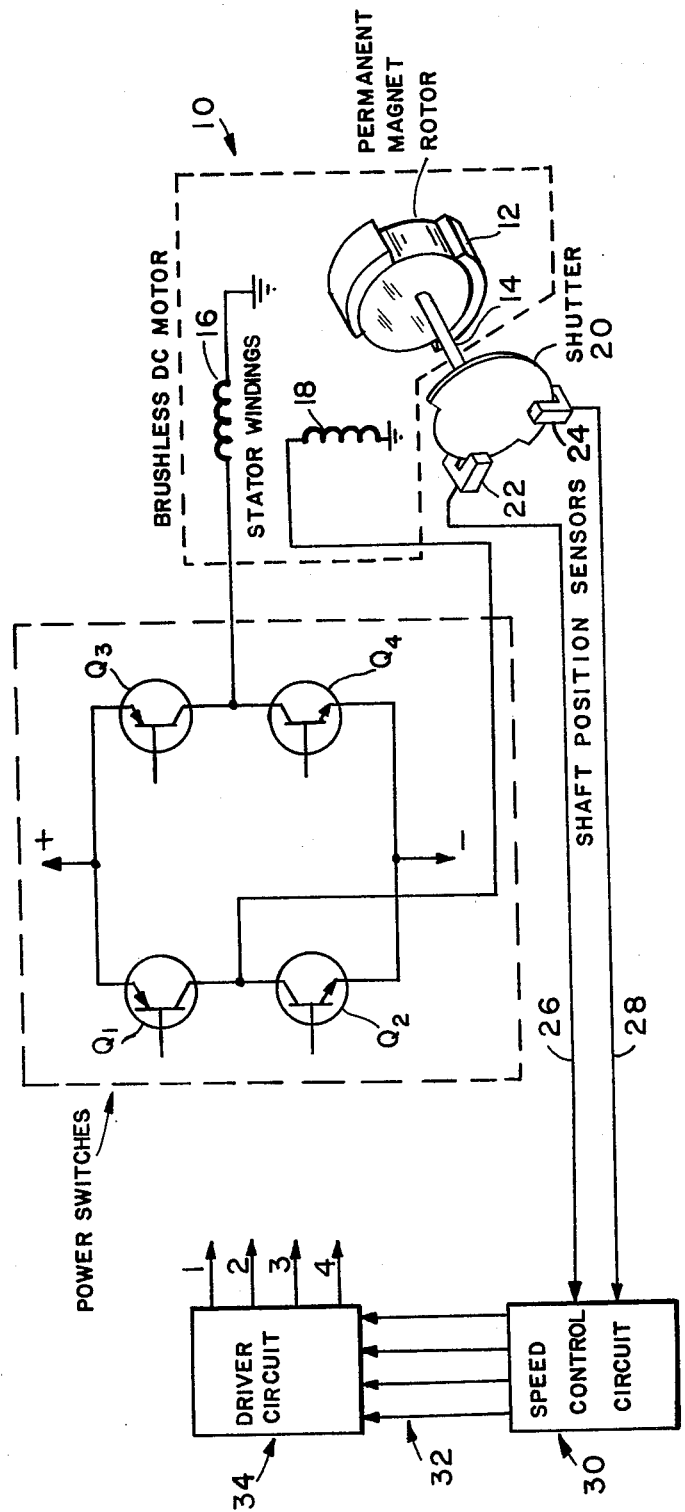
FIG. 1 is a block diagram of a prior art system for controlling a brushless DC motor.

Referring to the figures, and more particularly FIG. 1 thereof, the essential components of a brushless DC motor control system are illustrated. It is to be emphasized that the motor, per se, does not form part of the present invention. Brushless DC motors are widely available from various sources including the assignee of the present invention, namely, the Kearfott Division of the Singer Corporation. The assignee's product is designated as the Series CUO 9600 Motors.

For illustrative purposes, the brushless DC motor generally indicated by reference numeral 10 in FIG. 1 has a permanent magnet rotor 12 attached to a shaft 14 which is driven by the energization of the two phase stator windings 16 and 18. A shutter 20 is mounted on shaft 14 and serves to actuate shaft position sensors 22 and 24. The sensors may be of the electro-optical type or Hall magnetic sensors. Each sensor has its output lead (26, 28) connected to the input of a speed control circuit 30. This prior art circuit translates the outputs from the shaft position sensors to generate an input signal along input lines 32 to a driver circuit 34. The driver circuit consists of conventional logic circuitry fabricated on integrated circuit chips. The output lines from the driver circuit 34 are indicated by numerals 1–4 which correspond as inputs to the power switches $Q_1$–$Q_4$. The power switch configuration for energizing the stator windings 16 and 18 may include power transistors or SCR's. Thus far, a prior art brushless DC motor control system has been explained.

Figure 2:
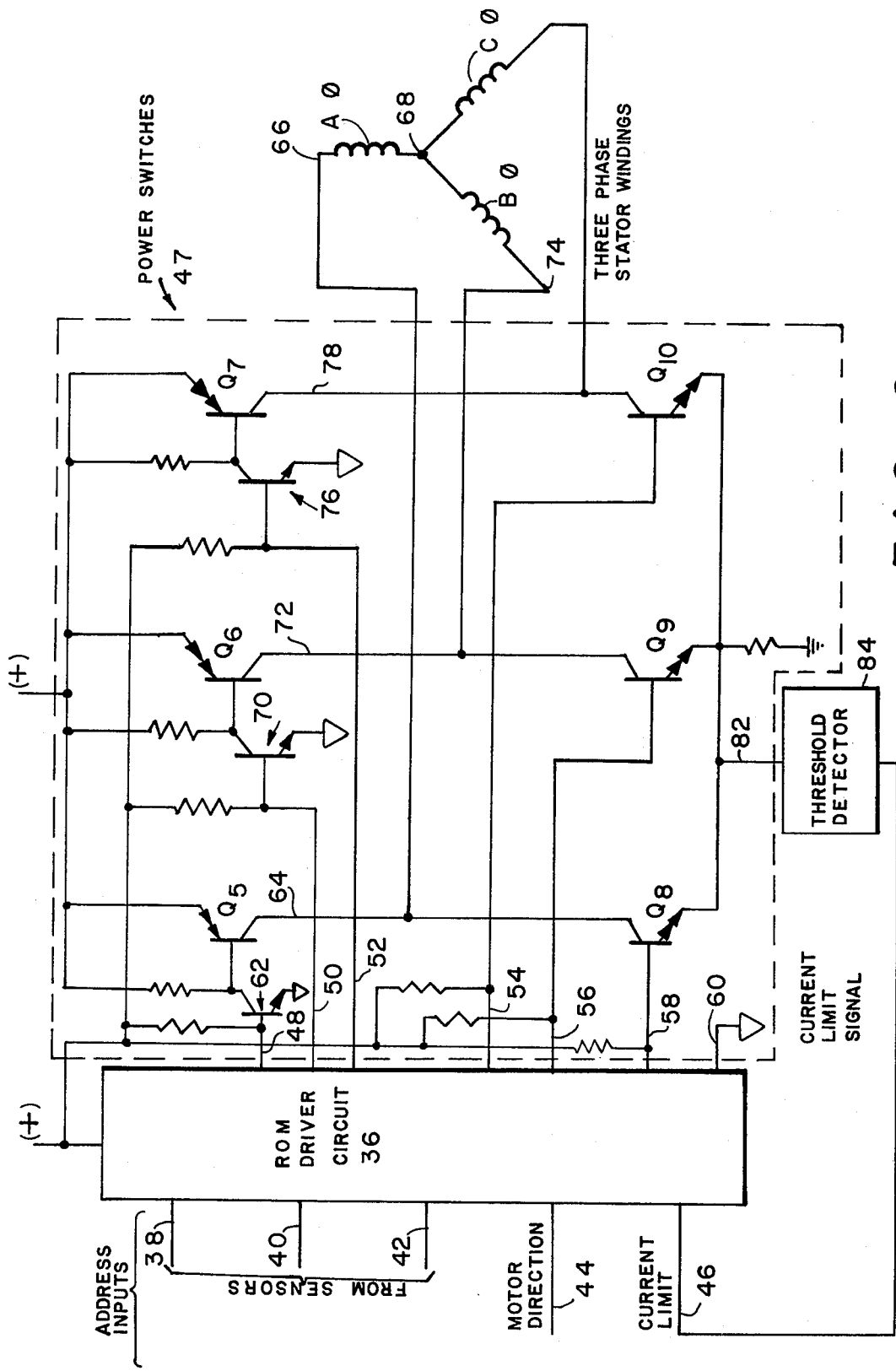
FIG. 2 is a schematic diagram of the present ROM implemented driver circuit for a brushless DC motor.

FIG. 2 illustrates an improvement in this type of system which constitutes the present invention. Rather than implementing the driver circuit 34 as integrated circuit logic, the present invention utilizes a ROM, addressed by the sensors, and generating digital output signals for controlling the operation of power switches. Referring to FIG. 2, a ROM driver circuit is schematically illustrated by reference numeral 36. Typically, the ROM may be a low capacity memory such as the type designated in the industry by number 5330 and typically manufactured by Monolithic Memories, Inc. A 32×8 configuration is sufficient for most purposes.

The address inputs 38, 40 and 42 would be connected to three shaft position sensors of the Hall type or electrooptic type, as previously explained in connection with the sensors of FIG. 1. In the case of a three-phase winding system such as shown in connection with the embodiment of FIG. 2, a minimum of three sensors are required, particularly when motor direction reversals must be sensed. In the case of a two-phase winding system as shown in FIG. 1, two sensors are required. An additional address input 44 is provided to the ROM driver circuit 36 to furnish information regarding the sense of motor shaft direction. Still further, an additional address input 46 may be furnished to the ROM driver circuit 36 for providing a signal indicative of a need for limiting the current delivered to the stator windings, which condition occurs when the windings are drawing too much load current.

The power switches generally indicated as 47 serve to selectively energize two of the stator windings at any instant of operation. In a preferred embodiment, each of the six switches $Q_5$–$Q_{10}$ is a schematic shorthand notation for a Darlington pair of transistors. In the case of the embodiment shown in FIG. 2, output leads 48, 50 and 52 are respectively connected to the input of level shifting transistors 62, 70 and 76, which simply boost the input level for the power switches $Q_5$, $Q_6$ and $Q_7$. Power switch $Q_5$ cooperates with the Darlington pair $Q_8$ via connection 64, $Q_8$ being turned on by a further output 58 from the ROM driver circuit 36. Similar connections to the inputs of power switches $Q_9$ and $Q_{10}$ appear along leads 56 and 54, respectively. The output lead 60 of the ROM driver circuit 36 is grounded.

In operation, in the event that $Q_5$ and $Q_8$ are turned on, current will flow through $Q_5$ to the input terminal 66 of the A phase winding, enter the node 68 and exits through the B phase winding to terminal 74 and thereafter to ground through $Q_9$. In the event of current reversal through these windings, current flow will occur via $Q_9$ phase B and phase A windings to $Q_5$. Similar switching circuit current paths including connections 72 and 78 are established through the other power switches and the three-phase windings. The emitter terminals of the transistor power switches $Q_8$, $Q_9$ and $Q_{10}$ are connected together via connecting lead 82 to a current threshold detector 84 of a conventional type. In the event that an output occurs from the threshold detector 84, the stator windings are drawing too much load current which could damage a motor. To avoid this situation, a current limiting signal from the threshold detector 84 is fed back via lead 46 to the ROM driver circuit 36 thereby causing the power switches 47 to turn off. This terminates further energization of the windings until a corrected condition is able to sustain itself.

Table I appearing hereafter represents a truth table for the ROM program.

The ROM outputs in Table I express six bit words. Each word read from right to left represents the states of power switches $Q_5$–$Q_{10}$. Where the "Current Limit" bit of the ROM address Input is a binary zero, excessive load current demand occurs and the corresponding ROM output bits will all be zero.

TABLE I
ROM PROGRAM FOR FIG. 2

| | ROM Address Inputs | | | | | ROM Outputs | | | | | |
|---|---|---|---|---|---|---|---|---|---|---|---|
| | Current Limit | Motor Direction | Sensors | | | ROM Outputs | | | | | |
| 0 | 1 | 1 | 0 | 0 | 0 | 0 | 0 | 0 | 0 | 0 | 0 |
| 1 | 1 | 1 | 0 | 0 | 1 | 1 | 0 | 0 | 0 | 0 | 1 |
| 2 | 1 | 1 | 0 | 1 | 0 | 0 | 0 | 1 | 0 | 1 | 0 |
| 3 | 1 | 1 | 0 | 1 | 1 | 1 | 0 | 0 | 0 | 1 | 0 |
| 4 | 1 | 1 | 1 | 0 | 0 | 0 | 1 | 0 | 1 | 0 | 0 |
| 5 | 1 | 1 | 1 | 0 | 1 | 0 | 1 | 0 | 0 | 0 | 1 |
| 6 | 1 | 1 | 1 | 1 | 0 | 0 | 0 | 1 | 1 | 0 | 0 |
| 7 | 1 | 1 | 1 | 1 | 1 | 0 | 0 | 0 | 0 | 0 | 0 |
| 8 | 1 | 0 | 0 | 0 | 0 | 0 | 0 | 0 | 0 | 0 | 0 |
| 9 | 1 | 0 | 0 | 0 | 1 | 0 | 0 | 1 | 1 | 0 | 0 |
| 10 | 1 | 0 | 0 | 1 | 0 | 0 | 1 | 0 | 0 | 0 | 1 |
| 11 | 1 | 0 | 0 | 1 | 1 | 0 | 1 | 0 | 1 | 0 | 0 |
| 12 | 1 | 0 | 1 | 0 | 0 | 1 | 0 | 0 | 0 | 1 | 0 |
| 13 | 1 | 0 | 1 | 0 | 1 | 0 | 0 | 1 | 0 | 1 | 0 |
| 14 | 1 | 0 | 1 | 1 | 0 | 1 | 0 | 0 | 0 | 0 | 1 |
| 15 | 1 | 0 | 1 | 1 | 1 | 0 | 0 | 0 | 0 | 0 | 0 |
| 16 | 0 | 1 | 0 | 0 | 0 | 0 | 0 | 0 | 0 | 0 | 0 |
| 17 | 0 | 1 | 0 | 0 | 1 | 0 | 0 | 0 | 0 | 0 | 0 |
| 18 | 0 | 1 | 0 | 1 | 0 | 0 | 0 | 0 | 0 | 0 | 0 |
| 19 | 0 | 1 | 0 | 1 | 1 | 0 | 0 | 0 | 0 | 0 | 0 |
| 20 | 0 | 1 | 1 | 0 | 0 | 0 | 0 | 0 | 0 | 0 | 0 |
| 21 | 0 | 1 | 1 | 0 | 1 | 0 | 0 | 0 | 0 | 0 | 0 |
| 22 | 0 | 1 | 1 | 1 | 0 | 0 | 0 | 0 | 0 | 0 | 0 |
| 23 | 0 | 1 | 1 | 1 | 1 | 0 | 0 | 0 | 0 | 0 | 0 |
| 24 | 0 | 0 | 0 | 0 | 0 | 0 | 0 | 0 | 0 | 0 | 0 |
| 25 | 0 | 0 | 0 | 0 | 1 | 0 | 0 | 0 | 0 | 0 | 0 |
| 26 | 0 | 0 | 0 | 1 | 0 | 0 | 0 | 0 | 0 | 0 | 0 |
| 27 | 0 | 0 | 0 | 1 | 1 | 0 | 0 | 0 | 0 | 0 | 0 |
| 28 | 0 | 0 | 1 | 0 | 0 | 0 | 0 | 0 | 0 | 0 | 0 |
| 29 | 0 | 0 | 1 | 0 | 1 | 0 | 0 | 0 | 0 | 0 | 0 |
| 30 | 0 | 0 | 1 | 1 | 0 | 0 | 0 | 0 | 0 | 0 | 0 |
| 31 | 0 | 0 | 1 | 1 | 1 | 0 | 0 | 0 | 0 | 0 | 0 |

From the above description of the invention, it will be noted that the ROM implementation of a driver circuit 36 achieves a simple and effective improvement for brushless DC motor control systems.

It should be understood that the invention is not limited to the exact details of construction shown and described herein for obvious modifications will occur to persons skilled in the art.

We claim the following:

1. In a control system for a brushless DC motor incorporating stator windings and having motor shaft position sensors connected to the input of a speed control circuit which in turn generates a digital signal at the output thereof, an improved motor driver circuit for the system, comprising:

a ROM connected at several of its inputs to the output of the speed control circuit, the ROM having a preselected program of operation;

means connected to an output of the ROM for switching power between selected terminals of the motor stator windings threshold detection means connected between the power switching means and an additional input to the ROM for generating an input signal to the ROM which causes the power switching means to terminate energization of the windings when the load current through the windings exceeds a preselected threshold level.

2. The subject matter set forth in claim 1 together with:

an additional input connected to the ROM for changing the direction of motor rotor rotation;

and further wherein the power switching means comprises a plurality of power transistors connected in Darlington pair configurations.

* * * * *